United States Patent
Furukawa et al.

(10) Patent No.: US 12,378,378 B2
(45) Date of Patent: Aug. 5, 2025

(54) EPOXY RESIN COMPOSITION, PREPREG, AND FIBER REINFORCED COMPOSITE MATERIAL

(71) Applicant: TORAY INDUSTRIES, INC., Tokyo (JP)

(72) Inventors: Koji Furukawa, Iyo-gun (JP); Kentaro Sano, Iyo-gun (JP); Junko Kawasaki, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 615 days.

(21) Appl. No.: 17/773,706

(22) PCT Filed: Nov. 5, 2020

(86) PCT No.: PCT/JP2020/041341
§ 371 (c)(1),
(2) Date: May 2, 2022

(87) PCT Pub. No.: WO2021/095631
PCT Pub. Date: May 20, 2021

(65) Prior Publication Data
US 2022/0380561 A1   Dec. 1, 2022

(30) Foreign Application Priority Data
Nov. 15, 2019 (JP) ................................. 2019-206899

(51) Int. Cl.
*C08J 5/24* (2006.01)
*C08G 59/50* (2006.01)

(52) U.S. Cl.
CPC .......... *C08J 5/249* (2021.05); *C08G 59/5033* (2013.01); *C08J 2363/00* (2013.01)

(58) Field of Classification Search
CPC .... C08J 5/249; C08J 2363/00; C08G 59/5033
USPC ......................................................... 523/400
See application file for complete search history.

(56) References Cited

FOREIGN PATENT DOCUMENTS

| | | |
|---|---|---|
| CN | 103554845 A | 2/2014 |
| CN | 104987664 A | 10/2015 |
| CN | 109385043 A | 2/2019 |
| JP | 2002-20459 A | 1/2002 |
| JP | 2014-227473 A | 12/2014 |
| JP | 2018-53065 A | 4/2018 |

OTHER PUBLICATIONS

Soeda et al., JP 2002-020459 A machine translation in English, Jan. 23, 2002. (Year: 2002).*
International Search Report, issued in PCT/JP2020/041341, PCT/ISA/210, dated Jan. 12, 2021.
Written Opinion of the International Searching Authority, issued in PCT/JP2020/041341, PCT/ISA/237, dated Jan. 12, 2021.

* cited by examiner

*Primary Examiner* — David T Karst
(74) *Attorney, Agent, or Firm* — Birch, Stewart, Kolasch & Birch, LLP

(57) ABSTRACT

An epoxy resin composition includes components [A] to [C]: [A] epoxy resin, [B] polyamine curing agent, and [C] a compound having a boiling point of 130° C. or more, a molecular weight of 50 to 250, no epoxy group in the molecule and substantially no ability to cure an epoxy resin. The composition satisfies conditions (1) and (2):
(1) at least one of the component [C] compounds has a Hansen solubility parameter based on the sum of the polar component and the hydrogen bond component of 10.0 or less, and
(2) the ratio C/E of the moles E of the epoxy groups of component [A] to the moles C of the component [C] compound(s) satisfying condition (1) is 0.01 to 0.20.

4 Claims, No Drawings

EPOXY RESIN COMPOSITION, PREPREG, AND FIBER REINFORCED COMPOSITE MATERIAL

TECHNICAL FIELD

The present invention relates to an epoxy resin composition preferably used for fiber reinforced composite materials for aerospace applications, general industrial applications, and sports applications, and a prepreg and a fiber reinforced composite material using the epoxy resin composition.

BACKGROUND ART

Fiber reinforced composite materials in which carbon fibers, aramid fibers and the like are used as reinforcing fibers are widely utilized in structural materials such as aircraft and motor vehicles, sports applications such as tennis rackets, golf shafts, fishing rods, bicycles, and housings, and general industrial applications, due to the high specific strength and specific elastic modulus thereof. As the resin composition to be used for this fiber reinforced composite material, a thermosetting resin is mainly used from the viewpoint of heat resistance and productivity, and of these, an epoxy resin is preferably used from the viewpoint of mechanical properties such as adhesive property with a reinforcing fiber.

In recent years, in order to apply a fiber reinforced composite material to applications requiring further weight reduction, it is necessary to improve various physical properties. Therefore, for the purpose of improving various mechanical properties of the fiber reinforced composite material, improvement of the elastic modulus, elongation, strength, and Tg of the epoxy resin used as the matrix resin is required. However, an epoxy resin cured product having a high elastic modulus and Tg is generally brittle, and tends to have low elongation and strength. Therefore, it is a technical problem to simultaneously improve high elastic modulus, Tg, elongation, and strength.

In order to improve this problem, various investigations have been performed. For example, there has been investigated a method for improving the elastic modulus and strength by combining an epoxy resin having a specific structure and a nanofiller (Patent Document 1). In addition, there has been investigated a method for improving the resin strength by compounding an additive in order to prevent the dicyandiamide used as a curing agent from remaining dissolved and becoming a defect (Patent Document 2).

PRIOR ART DOCUMENTS

Patent Documents

Patent Document 1: Japanese Patent Laid-open Publication No. 2018-95675
Patent Document 2: WO 2019-181402

SUMMARY OF THE INVENTION

Problems to be Solved by the Invention

When the technique of Patent Document 1 is used, the mechanical properties of the resulting cured resin or fiber reinforced composite material are insufficient, and further improvement of the mechanical properties is required. In addition, when the technique of Patent Document 2 is used, the effect of improving the resin strength can be obtained; however, the improvement of the elastic modulus and Tg is not considered at all, and a technique capable of improving any of the elastic modulus, Tg, and the strength is required.

Therefore, an object of the present invention is to provide an epoxy resin composition that can be preferably used for prepreg and fiber reinforced composite material applications, has high Tg, and is excellent in elastic modulus and strength.

Solutions to the Problems

The present invention adopts the following means in order to solve the problems. That is, the epoxy resin composition of the present invention includes the following components [A] to [C] and satisfies the following conditions (1) to (2):

[A]: epoxy resin
[B]: polyamine curing agent, and
[C]: a compound having a boiling point of 130° C. or more and a molecular weight m of 50 or more and 250 or less, the compound having no epoxy group in the molecule and having substantially no curing ability of an epoxy resin (1): at least a part of the component [C] satisfies that the sum of the polar component and the hydrogen bond component in the Hansen solubility parameters is 10.0 or less.
(2): the ratio C/E of the amount by mole, E, for epoxy groups of the component [A] to the amount by mole, C, of the component [C] satisfying the condition (1) is 0.01 or more and 0.20 or less.

In addition, the present invention provides a prepreg including the epoxy resin composition of the present invention and a reinforcing fiber.

In addition, the present invention provides a fiber reinforced composite material including a cured product of the epoxy resin composition of the present invention and a reinforcing fiber.

Effects of the Invention

The present invention can provide an epoxy resin composition having high Tg and excellent in elastic modulus and strength, the epoxy resin composition capable of being preferably used for prepreg and fiber reinforced composite material applications.

EMBODIMENTS OF THE INVENTION

Hereinafter, the present invention will be described in detail. In the present invention, "or more" means the same as or more than the numerical value indicated therein. In addition, "or less" means the same as or less than the numerical value indicated therein.

The resin composition of the present invention includes the components [A] to [C] as essential components. In the present invention, the "component" means a compound included in the composition.

The component [A] in the present invention is an epoxy resin. The epoxy resin of the component [A] is preferably an epoxy resin including two or more epoxy groups in one molecule, because of allowing increasing the glass transition temperature of a cured product obtained by thermally curing the resin composition and improving the heat resistance. In addition, an epoxy resin including one epoxy group in one molecule may be compounded. These epoxy resins may be used singly or may be appropriately used in combination.

Examples of the epoxy resin of the component [A] include epoxy resins such as diaminodiphenylmethane type, diaminodiphenylsulfone type, aminophenol type, bisphenol type, metaxylenediamine type, 1,3-bisaminomethylcyclohexane type, isocyanurate type, hydantoin type, phenol novolac type, orthocresol novolac type, trishydroxyphenylmethane type, and tetraphenylolethane type. Of these, epoxy resins such as diaminodiphenylmethane type, aminophenol type, and bisphenol type are particularly preferably used, because of having a good balance of physical properties.

Examples of commercially available products of the diaminodiphenylmethane epoxy resin include ELM434 (manufactured by Sumitomo Chemical Co., Ltd.), "Araldite (registered trademark)" MY720 (manufactured by Huntsman Advanced Materials LLC), "Araldite (registered trademark)" MY721 (manufactured by Huntsman Advanced Materials LLC.), "Araldite (registered trademark)" MY9512 (manufactured by Huntsman Advanced Materials LLC.), "Araldite (registered trademark)" MY9663 (manufactured by Huntsman Advanced Materials LLC.), and "Epotohto (registered trademark)" YH-434 (manufactured by Tohto Kasei Co., Ltd.), and "jER (registered trademark)" 630 (manufactured by Mitsubishi Chemical Corporation).

Examples of commercially available products of the diaminodiphenyl sulfone type epoxy resin include TG3DAS (manufactured by Mitsui Fine Chemicals, Inc.).

Examples of commercially available products of the aminophenol type epoxy resin include ELM120 (manufactured by Sumitomo Chemical Co., Ltd.), ELM100 (manufactured by Sumitomo Chemical Co., Ltd.), "jER (registered trademark)" 630 (manufactured by Mitsubishi Chemical Corporation), "Araldite (registered trademark)" MY0500 (manufactured by Huntsman Advanced Materials LLC.), "Araldite (registered trademark)" MY0510 (manufactured by Huntsman Advanced Materials LLC.), "Araldite (registered trademark)" MY0600 (manufactured by Huntsman Advanced Materials LLC.), and "Araldite (registered trademark)" MY0610 (manufactured by Huntsman Advanced Materials LLC.).

Examples of commercially available products of the bisphenol A type epoxy resin include "EPON (registered trademark)" 825 (manufactured by Mitsubishi Chemical Corporation), "EPICLON (registered trademark)" 850 (manufactured by DIC Corporation), "Epotohto (registered trademark)" YD-128 (manufactured by Tohto Kasei Co., Ltd.), and DER-331 and DER-332 (manufactured by The Dow Chemical Company).

Examples of commercially available products of the bisphenol F type epoxy resin include "Araldite (registered trademark)" GY282 (manufactured by Huntsman Advanced Materials LLC.), "jER (registered trademark)" 806, "jER (registered trademark)" 807, "jER (registered trademark)" 1750 (manufactured by Mitsubishi Chemical Corporation), "EPICLON (registered trademark)" 830 (manufactured by DIC Corporation), and "Epotohto (registered trademark)" YD-170 (manufactured by Tohto Kasei Co., Ltd.).

In addition, in the epoxy resin composition of the present invention, an epoxy compound other than the above compound may be appropriately compounded.

The component [B] in the present invention is a polyamine curing agent. The polyamine curing agent has a plurality of amino groups (amino groups include two aspects) capable of reacting with an epoxy group, and functions as a curing agent.

Examples of the polyamine curing agent include aliphatic polyamines and aromatic polyamines. These polyamine curing agents may be used singly, or may be appropriately used in combination Aromatic polyamines, particularly aromatic diamines, are excellent as curing agents in that the cured epoxy resin can be provided with high mechanical properties and heat resistance.

Examples of those classified as aromatic polyamines include diethyltoluenediamine such as 2,2'-diethyldiaminodiphenylmethane, 2,4-diethyl-6-methyl-m-phenylenediamine, 4,6-diethyl-2-methyl-m-phenylenediamine, and 4,6-diethyl-m-phenylenediamine, 4,4'-methylenebis(N-methylaniline), 4,4'-methylenebis(N-ethylaniline), 4,4'-methylenebis(N-sec-butylaniline), N,N'-di-sec-butyl-p-phenylenediamine, 4,4'-diaminodiphenylmethane, 3,3'-diaminodiphenylsulfone, 4,4'-diaminodiphenylsulfone, 3,3'-diisopropyl-4,4'-diaminodiphenylmethane, 3,3'-di-t-butyl-4,4'-diaminodiphenylmethane, 3,3'-diethyl-5,5'-dimethyl-4,4'-diaminodiphenylmethane, 3,3'-di-t-butyl-5,5'-dimethyl-4,4'-diaminodiphenylmethane, 3,3',5,5'-tetraethyl-4,4'-diaminodiphenylmethane, 3,3'-diisopropyl-5,5'-diethyl-4,4'-diaminodiphenylmethane, 3,3'-di-t-butyl-5,5'-diethyl-4,4'-diaminodiphenylmethane, 3,3'-di-t-butyl-5,5'-diisopropyl-4,4'-diaminodiphenylmethane, and 3,3',5,5'-tetra-t-butyl-4,4'-diaminodiphenylmethane. Of these, 3,3'-diaminodiphenyl sulfone and 4,4'-diaminodiphenyl sulfone are preferably used because the resulting cured product has excellent mechanical properties.

Examples of a commercially available product of the aromatic polyamine curing agent include products Seikacure-S (manufactured by Wakayama Seika Kogyo Co., Ltd.), MDA-220 (manufactured by Mitsui Chemicals, Inc.), "jER CURE (registered trade name)" W (manufactured by Mitsubishi Chemical Corporation), 3,3'-DAS (manufactured by Mitsui Chemicals, Inc.), and "Lonzacure (registered trade name)" M-DEA, "Lonzacure (registered trade name)" M-DIPA, "Lonzacure (registered trade name)" M-MIPA and "Lonzacure (registered trade name)" DETDA 80 (each manufactured by a company, Lonza).

As the compounding amount of the polyamine curing agent in the present invention, the ratio H/E between the amount by mole, E, of epoxy groups of the component [A] and the amount by mole, H, of active hydrogen of the polyamine curing agent is preferably 0.50 or more and 1.30 or less, more preferably 0.70 or more and 1.20 or less, and still more preferably 0.80 or more and 1.10 or less. Setting H/E within such a range can appropriately form a cross-linked structure by the reaction between the epoxy resin and the polyamine curing agent, and a cured resin having excellent strength and elongation can be obtained. In addition, setting H/E to 0.80 or more and 1.10 or less easily retains the component [C] to be described later in the cross-linked structure, and the effect of improving the elastic modulus, strength, and elongation is obtained.

The component [C] is a compound having a boiling point of 130° C. or more, a molecular weight m of 50 or more and 250 or less, having no epoxy group in the molecule, and substantially having no curing ability of an epoxy resin. Herein, compounds such as an amine and a phenol that can undergo an addition reaction with the epoxy resin, an acid anhydride that can be copolymerized with the epoxy resin, imidazole that can be a self-polymerization reaction initiator of the epoxy resin, an aromatic urea compound, and a tertiary amine compound are compounds having the curing ability of the epoxy resin, and do not correspond to compounds having no curing ability of the epoxy resin.

The component [C] is present in the void portion without being incorporated into the cross-linked structure in the cross-linked structure formed by reaction of the epoxy resin and the polyamine, and the state thereof is maintained after curing. This increases the elastic modulus of the resulting cured epoxy resin. In addition, the inventors surprisingly have found that not only a high elastic modulus but also a cured epoxy resin having high elongation and high strength can be obtained by compounding the component [C]. The reason for this is not clear; however, the inventor considers as follows. The component [C] has no epoxy group in the molecule and substantially has no curing ability of an epoxy resin, thereby generating no reaction with an epoxy resin or a polyamine that forms a cross-linked structure. Therefore, the inventor considers that the component [C] is not bound by a covalent bond with a cross-linked structure formed by reaction of an epoxy resin and a polyamine, and is appropriately held in the voids of the cross-linked structure, whereby voids in the cured product can be effectively filled, and the elastic modulus of the cured product is increased. In addition, the inventor considers that when distortion is imparted to the cured product, the component [C] can freely move in the cross-linked structure, and therefore the strain energy up to destruction can be relaxed, and the elongation and strength of the cured product are increased.

The boiling point of the component [C] is 130° C. or more, more preferably 180° C. or more, whereby volatilization of the component [C] when the epoxy resin composition is cured can be suppressed, and a cured resin or a fiber reinforced composite material excellent in mechanical properties can be obtained. Furthermore, generation of voids and deterioration of mechanical properties in the obtained fiber reinforced composite material can be preferably suppressed. In the present invention, the boiling point is a value at normal pressure (101 kPa). In addition, when the boiling point at normal pressure cannot be measured, a converted boiling point converted to 101 kPa in a boiling point conversion table can be used.

The molecular weight m of the component [C] is 50 or more to 250 or less. Setting the molecular weight of the component [C] within such a range appropriately retains the component [C] in voids of a cross-linked structure formed by reaction of an epoxy resin and a polyamine, and a cured product excellent in elastic modulus, strength, and elongation is obtained. In addition, setting the molecular weight m of the component [C] to 70 or more and 250 or less provides a cured product particularly excellent in elastic modulus, and setting the molecular weight m of 120 or more and 200 or less provides a cured product further excellent in elastic modulus. In addition, setting 50 or more and 120 or less can provide a cured product particularly excellent in strength and Tg.

In addition, in the epoxy resin composition of the present invention, it is important that at least a part of the component [C] satisfies that the sum ($\delta P + \delta H$) of the polar component ($\delta P$) and the hydrogen bond component ($\delta H$) in the Hansen solubility parameter (HSP) is 10.0 or less (condition (1)), and preferably 8.0 or less, more preferably 7.0 or less, and still more preferably 6.0 or less. As the sum of the polar component and the hydrogen bond component in the HSP of the component [C] is smaller, a decrease in Tg of the resulting cured epoxy resin can be suppressed.

Herein, the Hansen solubility parameter (HSP) is a type of dissolution parameter expressed by three components of a dispersion component ($\delta D$), a polar component ($\delta P$), and a hydrogen bond component ($\delta H$), and can be expressed as a three-dimensional vector. The HSP can unambiguously calculate a value at 25° C. from the chemical structure of each component by using computer software Hansen Solubility Parameter in Practice (HSPiP) (http://www.hansen-solubility.com). In the present invention, the value of the target compound at 25° C. is calculated by using HSPiP ver. 5.0. 06 (product sold by Eizo Kobo Question) and used.

When two or more compounds are used as the component [C], it is determined whether or not the condition (1) is satisfied for each component of the component [C].

Examples of the component [C] that also satisfies the condition (1) include 1,2-dimethylbenzene, 1,3-dimethylbenzene, 1,4-dimethylbenzene, biphenyl, 1,2-diphenylbenzene, 1,3-diphenylbenzene, and 1,4-diphenylbenzene. These compounds may be used singly or appropriately used in combination.

The epoxy resin composition of the present invention is important to have the relationship that the ratio C/E of the amount by mole, E, of epoxy groups of the component [A] to the amount by mole, C, of the component [C] satisfying the condition (1) is 0.01 or more and 0.20 or less (condition (2)). Setting C/E within such a range appropriately retains the component [C] in voids of a cross-linked structure formed by reaction of an epoxy resin and a polyamine, and a cured product excellent in elastic modulus, strength, elongation, and Tg is obtained. In addition, the molecular weight m of the component [C] is preferably 120 or more and 200 or less, and C/E is 0.01 or more and 0.20 or less, preferably 0.07 or more and 0.13 or less, thereby allowing providing a cured product having excellent both elastic modulus and strength.

In the epoxy resin composition of the present invention, at least a part of the component [C] preferably satisfies that a Hansen solubility parameter distance (HSP distance) L to the component [A] is 20.0 or less, more preferably 10.0 or less, and still more preferably 5.0 or less. As the HSP distance L between the component [A] and the component [C] is smaller, the affinity between the component [A] and the component [C] is higher and the components [A] and component [C] are easy to be uniformly compatible with each other, and therefore separation of these components from each other can be suppressed when the epoxy resin composition is cured. Therefore, the component [C] is easy to be appropriately retained in the void portion of the cross-linked structure, and an excellent effect of improving the elastic modulus and strength can be obtained.

Herein, the HSP distance is a parameter corresponding to a distance between three-dimensional vectors having three components of two different substances as coordinates when three-dimensional vectors ($\delta_D$, $\delta_P$, $\delta_H$) having three components of the HSP of a certain substance as coordinates are assumed. As the HSP distance L is smaller, the affinity of the two substances can be estimated to be higher. When the HSP of the first substance is $\delta_{D1}$, $\delta_{P1}$, and $\delta_{H1}$ and the HSP of the second substance is $\delta_{D2}$, $\delta_{P2}$, and $\delta_{H2}$, the HSP distance L can be calculated by a formula (1).

[Mathematical Formula 1]

$$L = \sqrt{4(\delta_{D2}-\delta_{D1})^2 + (\delta_{P2}-\delta_{P1})^2 + (\delta_{H2}-\delta_{H1})^2} \qquad \text{Formula (1)}$$

In addition, in the present invention, when the two components of epoxy resins are mixed and used as the component [A], the value of HSP of the mixed epoxy resin calculated by the following method can be used as the HSP of the component [A]. That is, when the epoxy resin 1 having HSP of $\delta_{Da}$, $\delta_{Pa}$, and $\delta_{Ha}$ and the epoxy resin 2 having HSP of $\delta_{Db}$, $\delta_{Pb}$, and $\delta_{Hb}$ are mixed at a mass ratio of Wa:Wb as the component [A], the HSP ($\delta_{Dm}$, $\delta_{Pm}$, $\delta_{Hm}$) of the mixed epoxy resin is a value calculated by a formula (2).

[Mathematical Formula 2]

$$[\delta_{Dm}, \delta_{Pm}, \delta_{Hm}] = [(Wa \times \delta_{Da} + Wb \times \delta_{Db}), (Wa \times \delta_{Pa} + Wb \times \delta_{Pb}), (Wa \times \delta_{Ha} + Wb \times \delta_{Hb})]/(Wa+Wb) \qquad \text{Formula (2)}$$

Furthermore, when three or more components of epoxy resins are mixed and used as the component [A], similarly, the value of HSP of the mixed epoxy resin expressed by addition of the three-dimensional vector of HSP of each component can be used as the HSP of the component [A].

When the compound having two or more components is used as the component [C], the HSP distance L to the component [A] for each compound of the component [C] is calculated. The HSP distance L between each compound of the component [C] and the component [A] is preferably 20.0 or less.

In the epoxy resin composition of the present invention, the ratio of the amount by mole, E, of an epoxy group of the component [A] to the amount by mole of the component [C] satisfying both the condition (1) and the condition regarding the HSP distance L to the component [A] ((the amount by mole of the component [C] satisfying both the condition (1) and the condition regarding the HSP distance L to the component [A])/E) is preferably 0.01 or more and 0.20 or less. Setting such a range appropriately retains the component [C] in voids of a cross-linked structure formed by reaction of an epoxy resin and an aromatic diamine, and a cured product excellent in elastic modulus, strength, and elongation is obtained. In addition, the molecular weight m of the component [C] is preferably 120 or more and 200 or less and (the amount by mole of the component [C] satisfying both the condition (1) and the condition regarding the HSP distance L to the component [A])/E is 0.01 or more and 0.20 or less, and more preferably 0.07 or more and 0.13 or less, thereby providing a cured product particularly excellent in both elastic modulus and strength.

The epoxy resin composition of the present invention is excellent in elastic modulus, strength, and elongation, and is preferably used as a matrix resin of a fiber reinforced composite material. Examples of a method for obtaining a fiber reinforced composite material include a method in which a reinforcing fiber is impregnated with a resin composition in a molding step, such as a hand lay-up method, a RTM method, a filament winding method, and a pultrusion method, and a method of molding a prepreg in which a reinforcing fiber is previously impregnated with a resin composition by an autoclave method or a press molding method. Of these, the arrangement of the fibers and the ratio of the resin can be precisely controlled and the properties of the composite material can be maximized, and therefore it is preferable to previously prepare a prepreg including an epoxy resin composition and a reinforcing fiber.

Preferable examples of the reinforcing fiber used in the prepreg and the fiber reinforced composite material of the present invention include carbon fiber, graphite fiber, aramid fiber, and glass fiber, and the carbon fiber is particularly preferable. The form and arrangement of the reinforcing fiber are not limited, and for example, fibrous structures such as a long fiber aligned in one direction, a single tow, woven fabric, knitting, and a braid are used. Two or more types of carbon fibers, glass fibers, aramid fibers, boron fibers, PBO fibers, high-strength polyethylene fibers, alumina fibers, and silicon carbide fibers may be used in combination as the reinforcing fiber.

Specific examples of the carbon fiber include acrylic-based, pitch-based, and rayon-based carbon fibers, and particularly, the acrylic-based carbon fiber having high tensile strength is preferably used.

Twisted yarns, untwisted yarns, and non-twisted yarns can be used as the form of the carbon fibers, and in the case of twisted yarns, the orientation of the filament constituting the carbon fiber is not parallel, thus causing a decrease in mechanical properties of the resulting carbon fiber reinforced composite material, and therefore there are preferably used untwisted yarns or non-twisted yarns having a good balance between moldability and strength properties of the carbon fiber reinforced composite material.

The carbon fiber preferably has a tensile elastic modulus of 200 GPa or more and 440 GPa or less. The tensile elastic modulus of the carbon fiber is affected by the crystallinity of the graphite structure constituting the carbon fiber, and the elastic modulus is improved as the crystallinity is higher. This range is preferable, because all of rigidity and strength of the carbon fiber reinforced composite material are balanced at a high level. The elastic modulus is more preferably 230 GPa or more and 400 GPa or less, still more preferably 260 GPa or more and 370 GPa or less. Herein, the tensile elastic modulus of the carbon fiber is a value measured according to JIS R7608 (2008).

The prepreg of the present invention can be produced by various known methods. For example, a prepreg can be produced by a hot melt method in which a resin composition is heated to reduce the viscosity without using an organic solvent, and a reinforcing fiber is impregnated therewith.

In addition, for the hot melt method, there can be used, for example, a method of directly impregnating a reinforcing fiber with a resin composition whose viscosity has been reduced by heating, or a method of first preparing a release paper sheet with a resin film in which the release paper is once coated with the resin composition, then superimposing the resin film on the reinforcing fiber side from both sides or one side of the reinforcing fiber, and heating and pressurizing to impregnate the reinforcing fiber with the resin composition.

The content of a reinforcing fiber in a prepreg is preferably 30% by mass or more and 90% by mass or less. At 30% by mass or more, more preferably 35% by mass or more, and still more preferably 65% by mass or more, it is easy to obtain an advantage of a fiber reinforced composite material excellent in specific strength and specific modulus. In addition, it is possible to prevent the amount of heat generation during curing from becoming too high during molding of the fiber reinforced composite material. Whereas, at 90% by mass or less, more preferably 85% by mass or less, generation of voids in the composite material due to poor impregnation of the resin can be suppressed. In addition, the tacking property of a prepreg can be maintained.

The fiber reinforced composite material of the present invention can be produced by a method in which the above-described prepreg of the present invention is laminated in a predetermined form and pressurized and heated to cure the resin as an example. Herein, for example, a press molding method, an autoclave molding method, a bagging molding method, a wrapping method, and an internal pressure molding method are adopted as a method of providing heat and pressure.

The fiber reinforced composite material of the present invention can be widely used in aerospace applications, general industrial applications, and sports applications. More specifically, preferable examples of general industrial applications include structures such as automobiles, ships, and railway vehicles. Preferable examples of sports applications include applications such as golf shafts, fishing rods, and rackets of tennis and badminton.

EXAMPLES

Hereinafter, the present invention will be described in more detail with reference to Examples. However, the scope of the present invention is not limited to these Examples. The unit "part" of the composition ratio refers to part by mass unless otherwise noted. In addition, measurement of various properties (physical properties) was performed under the environment of a temperature of 23° C. and a relative humidity of 50% unless otherwise noted.

<Materials Used in Examples and Comparative Examples>
(1) Component [A]: Epoxy Resin
"Araldite (registered trademark)" MY0600 (aminophenol type epoxy resin, epoxy equivalent: 118 g/eq, number of epoxy groups: 3, δD: 19.1, δP: 8.3, δH: 7.5, manufactured by Huntsman Advanced Materials LLC)
"jER (registered trademark)" 825 (bisphenol A epoxy resin, epoxy equivalent: 170 g/eq, number of epoxy groups: 2, δD: 18.9, δP: 6.6, δH: 5.3, manufactured by Mitsubishi Chemical Corporation)
Glycidol (molecular weight: 74 g/mol, epoxy equivalent: 74 g/eq, number of epoxy groups: 1, boiling point: 167° C., δD: 17.7, δP: 11.5, δH: 17.0, manufactured by Tokyo Chemical Industry Co., Ltd.)
(2) Component [B]: Aromatic Diamine
3,3'-DAS (3,3'-diaminodiphenylsulfone, active hydrogen equivalent: 62 g/eq, number of active hydrogens: 4, manufactured by Mitsui Fine Chemicals, Inc.)
(3) The component [C]: a compound having a boiling point of 130° C. or more, a molecular weight m of 50 or more and 250 or less, having no epoxy group in the molecule, and substantially having no curing ability of an epoxy resin.
1,4-Dimethylbenzene (boiling point: 139° C., molecular weight m: 106, δD: 18.2, δP: 3.1, δH: 3.4, manufactured by Tokyo Chemical Industry Co., Ltd.)
Biphenyl (boiling point: 256° C., molecular weight m: 154, δD: 19.0, δP: 2.1, δH: 3.2, manufactured by Tokyo Chemical Industry Co., Ltd.)
1,4-Diphenylbenzene (boiling point: 389° C., molecular weight m: 230, δD: 19.5, δP: 2.3, δH: 3.1, manufactured by Tokyo Chemical Industry Co., Ltd.)
1,2-Tetradecanediol (boiling point: 331° C., molecular weight m: 230, δD: 16.3, δP: 4.6, δH: 11.7, manufactured by Tokyo Chemical Industry Co., Ltd.)
(4) Other Compounds
Methylcyclopentane (boiling point: 72° C., molecular weight m: 84, δD: 16.1, δP: 0.1, δH: 0.1, manufactured by Tokyo Chemical Industry Co., Ltd.)
p-Quaterphenyl (boiling point: 428° C., molecular weight m: 306, δD: 19.8, δP: 2.4, δH: 3.0, manufactured by Tokyo Chemical Industry Co., Ltd.)
N,N'-diphenyl-4-methoxybenzamide (boiling point: 468° C., molecular weight m: 303, δD: 20.1, δP: 7.0, δH: 4.6, manufactured by Tokyo Chemical Industry Co., Ltd.)

<Various Evaluation Methods>
The epoxy resin composition of each example was measured by using the following measurement methods.
(1) Three-Point Bending Measurement of Cured Resin
The uncured resin composition was defoamed in a vacuum, then heated at a rate of 1.7° C./min from 30° C. in a mold set to have a thickness of 2 mm with a 2 mm thick "Teflon (registered trademark)" spacer, held at a temperature of 125° C. for 5 hours, then heated at a rate of 1.7° C./min, and cured at a temperature of 225° C. for 2 hours to provide a plate-shaped cured resin having a thickness of 2 mm. A test piece having a width of 10 mm and a length of 60 mm was cut out from the cured resin, and an Instron universal testing machine (manufactured by Instron Inc.) was used to set the span to 32 mm, the crosshead speed to 2.5 mm/min, and the number of samples to n=6, and to perform three-point bending according to JIS K7171 (1994), and the average values of the elastic modulus, the strength, and the elongation were defined as the elastic modulus, the strength, and the elongation of the cured resin, respectively.
(2) Measurement of Glass Transition Temperature of Cured Resin A test piece having a width of 12.7 mm and a length of 55 mm was cut out from a resin-cured plate produced in the same manner as in the above (1), and the glass transition temperature was determined by the DMA method according to SACMA SRM18R-94. In a storage modulus G' curve, a temperature at the intersection point between a tangent in glass region and a tangent in transition region was taken as the glass transition temperature. Herein, the measurement was performed at a temperature-raising rate of 5° C./min and a frequency of 1 Hz.

Example 1

(Production of Resin Composition)
A resin composition was prepared by the following method.

100 parts of "Araldite (registered trademark)" MY0600 as the component [A] described in Table 1 was charged into a kneading apparatus, heated to a target temperature of 55 to 65° C. while being kneaded, 53 parts of 3,3'-DAS as the component [B] was added, and stirring was performed for 30 minutes. Thereafter, 9 parts of 1,4-dimethylbenzene was added as the component [C], and was further stirred for 10 minutes to provide a resin composition.

In this case, the ratio H/E between the amount by mole, H, of active hydrogen of the component [B] and the amount by mole, E, of the epoxy group of the component [A] was 1.00, the ratio C/E of the amount by mole, C, of the component [C] to the amount by mole, E, of the epoxy group of the component [A] was 0.10, and the Hansen solubility parameter distance L between the component [A] and the component [C] was 6.9.

As a result of three-point bending measurement of the cured resin of the obtained resin composition, the elastic modulus was 5.2 GPa, the strength was 191 MPa, and the elongation was 4.7%. In addition, the glass transition temperature of the cured resin was measured and Tg was 196° C. As compared with Comparative Example 1 (without compounding of the component [C]) described later, excellent elastic modulus, strength, and elongation were obtained.

Examples 2 to 6

The components [A], [B] and [C] were compounded according to the compounding ratios in Table 1 in the same procedure as in Example 1 to provide resin compositions.

The various measurement results of Examples are as shown in Table 1, and excellent elastic modulus, strength, elongation, and Tg of the cured resin were obtained when the compounding of the resin composition was changed as in Examples 2 to 6.

Comparative Examples 1 to 7

The components [A] and [B] (and [C] or a substitute thereof) were compounded according to the compounding ratio in Table 2 in the same procedure as in Example 1 to provide resin compositions.

In Comparative Example 1, those corresponding to the component [C] was not compounded. When Comparative Example 1 is compared with Example 1, it is found that the elastic modulus, strength, and elongation of the cured resin are each improved by compounding the component [C], and particularly the strength and elongation are dramatically improved.

In Comparative Example 2, those corresponding to the component [C] was also not compounded. Comparison of Comparative Example 2 with Example 2 shows that compounding the component [C] dramatically improves the elastic modulus and strength of the cured resin.

In Comparative Example 3, methylcyclopentane was compounded instead of the component [C]. Methylcyclopentane does not satisfy the condition that the boiling point of the component [C] is 130° C. or more. Comparison between Comparative Example 3 and Example 2 shows that the elastic modulus and strength of the resulting cured resin are improved by compounding the component [C] satisfying the requirements that the boiling point is 130° C. or more.

In Comparative Example 4, p-quaterphenyl was compounded instead of the component [C]. p-Quaterphenyl does not satisfy the condition that the molecular weight m in the component [C] is 50 or more and 250 or less. Comparison between Comparative Example 4 and Example 2 shows that the component [C] satisfies the above conditions, thereby improving the elastic modulus, strength, and Tg of the resulting cured resin.

In Comparative Example 5, 1,2-tetradecanediol was compounded instead of the component [C]. 1,2-Tetradecanediol does not satisfy the condition that the sum of the polar component and the hydrogen bond component in the Hansen solubility parameters is 10.0 or less. Comparison between Comparative Example 5 and Example 2 shows that the sum of the polar component and the hydrogen bond component in the Hansen solubility parameter of the component [C] is 10.0 or less, thereby suppressing a decrease in Tg of the resulting cured resin, and improving the elastic modulus and strength.

Comparative Example 6 does not satisfy the condition that the ratio C/E between the amount by mole, E, of the epoxy group of the component [A] and the amount by mole, C, of the epoxy group of the component [C] is 0.01 or more and 0.20 or less. Comparison between Comparative Example 6 and Example 2 shows that satisfying the above conditions suppresses a decrease in Tg and improves the elastic modulus and elongation of the resulting cured resin.

In Comparative Example 7, N,N'-diphenyl-4-methoxybenzamide was compounded instead of the component [C]. N,N'-diphenyl-4-methoxybenzamide does not satisfy the condition that the molecular weight m in the component [C] is 50 or more and 250 or less, and further does not satisfy the condition that the sum of a polar component and a hydrogen bond component in the Hansen solubility parameters is 10.0 or less. Comparison between Comparative Example 7 and Example 1 shows that satisfying the above conditions suppresses a decrease in Tg of the resulting cured resin and improves the elastic modulus, strength, and elongation.

TABLE 1

|  |  | Example 1 | Example 2 | Example 3 | Example 4 | Example 5 | Example 6 |
|---|---|---|---|---|---|---|---|
| Component [A] | "Araldite (registered trademark)" MY0600 | 100 | — | — | — | — | — |
|  | "jER ®"825 | — | 100 | 100 | 100 | 100 | 100 |
| Component [B] | 3,3'-DAS | 53 | 35 | 35 | 35 | 53 | 53 |
| Component [C] | 1,4-Dimethylbenzene | 9 | 6 | — | — | — | — |
|  | Biphenyl | — | — | 5 | 9 | 15 | — |
|  | 1,4-Diphenylbenzene | — | — | — | — | — | 13 |
|  | 1,2-Tetradecanediol | — | — | — | — | — | — |
| Other compound [C'] | Methylcyclopentane | — | — | — | — | — | — |
|  | p-Quaterphenyl | — | — | — | — | — | — |
|  | N,N'-diphenyl-4-methoxybenzamide | — | — | — | — | — | — |
| Properties of resin composition | H/E | 1.00 | 1.00 | 1.00 | 1.00 | 1.00 | 1.00 |
|  | Boiling point of [C] or [C'] (° C.) | 139 | 139 | 256 | 256 | 256 | 365 |
|  | Molecular weight m of [C] or [C'] | 106 | 106 | 154 | 154 | 154 | 230 |
|  | δP + δH of [C] or [C'] | 6.4 | 6.4 | 5.3 | 5.3 | 5.3 | 5.4 |
|  | C/E | 0.10 | 0.10 | 0.05 | 0.10 | 0.17 | 0.10 |
|  | HSP distance L between [A] and [C] or [C'] | 6.9 | 4.3 | 5.0 | 5.0 | 5.0 | 5.0 |
| Properties of cured resin | Elastic modulus (GPa) | 5.2 | 3.6 | 3.7 | 3.8 | 3.7 | 3.7 |
|  | Strength (MPa) | 191 | 163 | 160 | 161 | 160 | 161 |
|  | Elongation (%) | 4.7 | 10 or more | 10 or more | 10 or more | 10 or more | 10 or more |
|  | Tg (° C.) | 196 | 159 | 156 | 144 | 142 | 143 |

TABLE 2-1

|  |  | Comparative Example 1 | Comparative Example 2 | Comparative Example 3 | Comparative Example 4 |
|---|---|---|---|---|---|
| Component [A] | "Araldite (registered trademark)" MY0600 | 100 | — | — | — |
|  | "jER ®"825 | — | 100 | 100 | 100 |

TABLE 2-1-continued

|  |  | Comparative Example 1 | Comparative Example 2 | Comparative Example 3 | Comparative Example 4 |
|---|---|---|---|---|---|
| Component [B] | 3,3'-DAS | 53 | 35 | 53 | 53 |
| Component [C] | 1,4-Dimethylbenzene | — | — | — | — |
|  | Biphenyl | — | — | — | — |
|  | 1,4-Diphenylbenzene | — | — | — | — |
|  | 1,2-Tetradecanediol | — | — | — | — |
| Other compound [C'] | Methylcyclopentane | — | — | 5 | — |
|  | p-Quaterphenyl | — | — | — | 17 |
|  | N,N'-diphenyl-4-methoxybenzamide | — | — | — | — |
| Properties of resin composition | H/E | 1.00 | 1.00 | 1.00 | 1.00 |
|  | Boiling point of [C] or [C'] (° C.) | — | — | 72 | 428 |
|  | Molecular weight m of [C] or [C'] | — | — | 84 | 306 |
|  | δP + δH of [C] or [C'] | — | — | 0.2 | 5.4 |
|  | C/E | 0.00 | 0.00 | 0.00 | 0.00 |
|  | HSP distance L between [A] and [C] or [C'] | — | — | 10.1 | 5.1 |
| Properties of cured resin | Elastic modulus (GPa) | 5.0 | 3.4 | 3.4 | 3.4 |
|  | Strength (MPa) | 181 | 152 | 151 | 153 |
|  | Elongation (%) | 4.2 | 10 or more | 10 or more | 8.2 |
|  | Tg (° C.) | 219 | 178 | 174 | 140 |

TABLE 2-2

|  |  | Comparative Example 5 | Comparative Example 6 | Comparative Example 7 |
|---|---|---|---|---|
| Component [A] | "Araldite (registered trademark)" MY0600 | — | — | 100 |
|  | "jER ®"825 | 100 | 100 | — |
| Component [B] | 3,3'-DAS | 53 | 53 | 53 |
| Component [C] | 1,4-Dimethylbenzene | — | — | — |
|  | Biphenyl | — | 20 | — |
|  | 1,4-Diphenylbenzene | — | — | — |
|  | 1,2-Tetradecanediol | 13 | — | — |
| Other compound [C'] | Methylcyclopentane | — | — | — |
|  | p-Quaterphenyl | — | — | — |
|  | N,N'-diphenyl-4-methoxybenzamide | — | — | 17 |
| Properties of resin composition | H/E | 1.00 | 1.00 | 1.00 |
|  | Boiling point of [C] or [C'] (° C.) | 331 | 256 | 468 |
|  | Molecular weight m of [C] or [C'] | 230 | 154 | 303 |
|  | δP + δH of [C] or [C'] | 16.3 | 5.3 | 11.6 |
|  | C/E | 0.00 | 0.22 | 0.00 |
|  | HSP distance L between [A] and [C] or [C'] | 8.5 | 5.0 | 3.8 |
| Properties of cured resin | Elastic modulus (GPa) | 3.5 | 3.5 | 4.9 |
|  | Strength (MPa) | 154 | 154 | 172 |
|  | Elongation (%) | 10 or more | 6.4 | 4.3 |
|  | Tg (° C.) | 128 | 134 | 177 |

The invention claimed is:

1. An epoxy resin composition comprising the following components [A] to [C]:
   [A] epoxy resin;
   [B] polyamine curing agent; and
   [C] one or more compounds having a boiling point of 180° C. or more, a molecular weight of 50 or more and 250 or less, no epoxy group in the compound molecule and substantially no ability to cure an epoxy resin,
   wherein the epoxy resin composition satisfies the following conditions (1) and (2):
   (1): at least a component [C] compound having a polar component and a hydrogen bond component has a Hansen solubility parameter of less than 10.0 when the polar component and the hydrogen bond component are summed; and
   (2) a ratio C/E of an amount by mole, E, of epoxy groups of the component [A] to an amount by mole, C, of the component [C] compound or compounds satisfying the condition (1) is 0.01 or more and 0.20 or less.

2. The epoxy resin composition according to claim 1, wherein the component [B] is an aromatic diamine.

3. A prepreg comprising the epoxy resin composition according to claim 1 and a reinforcing fiber.

4. A fiber reinforced composite material comprising a cured product of the epoxy resin composition according to claim 1 and a reinforcing fiber.

* * * * *